United States Patent [19]
Breda

[11] Patent Number: 5,685,330
[45] Date of Patent: Nov. 11, 1997

[54] DIVERTER VALVES WITH INTEGRAL BACK FLOW PREVENTER AND INLET AND OUTLET CHECK VALVE MECHANISMS

[76] Inventor: Silvano Breda, 125 Limestone Crescent, Downsview, Ontario, Canada, M3J 2H1

[21] Appl. No.: 391,558

[22] Filed: Feb. 21, 1995

[30] Foreign Application Priority Data

Sep. 15, 1994 [CA] Canada .................... 2132135

[51] Int. Cl.$^6$ .................................................. F16K 24/02
[52] U.S. Cl. ..................... 137/218; 137/625.46; 137/859
[58] Field of Search ....................... 137/218, 625.46, 137/859

[56] References Cited

U.S. PATENT DOCUMENTS 4,589,438  5/1986  Breda ........................ 137/218
4,951,702  8/1990  Brotcke ...................... 137/218
5,063,619  11/1991  Ross et al. ............... 137/218 X

*Primary Examiner*—Gerald A. Michalsky
*Attorney, Agent, or Firm*—Neil H. Hughes; Ivor M. Hughes; Marcelo K. Sarkis

[57] ABSTRACT

A cartridge for a valve housing having outlets, the cartridge comprising a stationary body sleeve for fixed insertion within the housing and having outlet ports permanently aligned with the outlets of the housing, a moveable substantially hollow stem sleeve inserted within the stationary body sleeve and having an opening selectively alignable with the ports of the stationary body sleeve, the body sleeve and hollow stem being connected to one another by a retaining ring which aligns and maintains the cartridge as a unit in the housing.

18 Claims, 17 Drawing Sheets

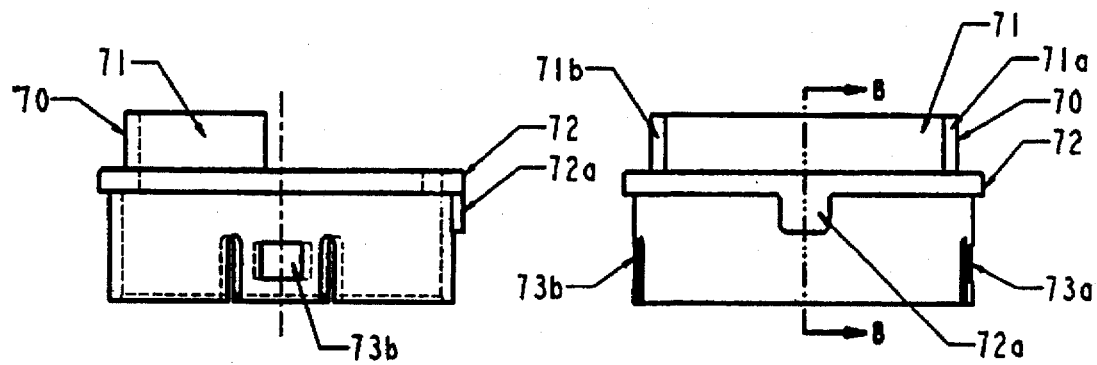
FIGURE 9b
FIGURE 9c
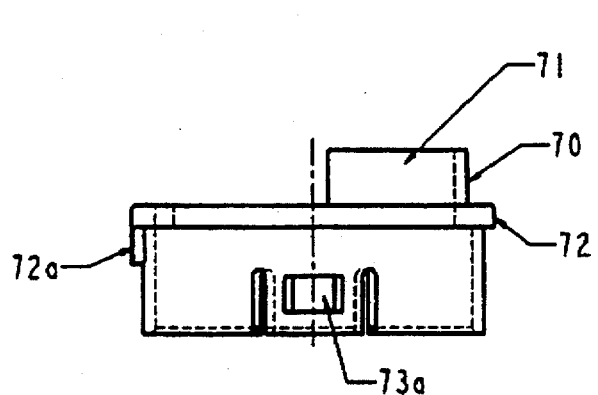
FIGURE 9d
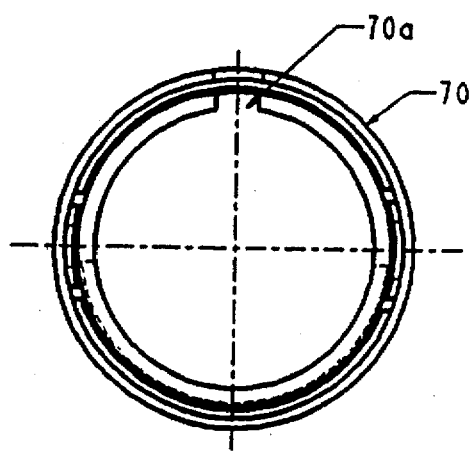
FIGURE 9e
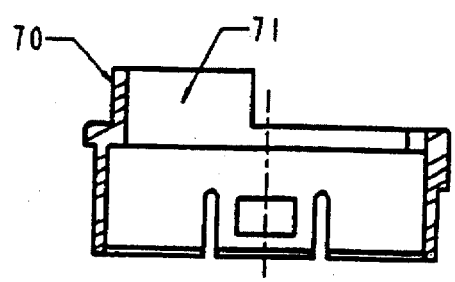
FIGURE 9f

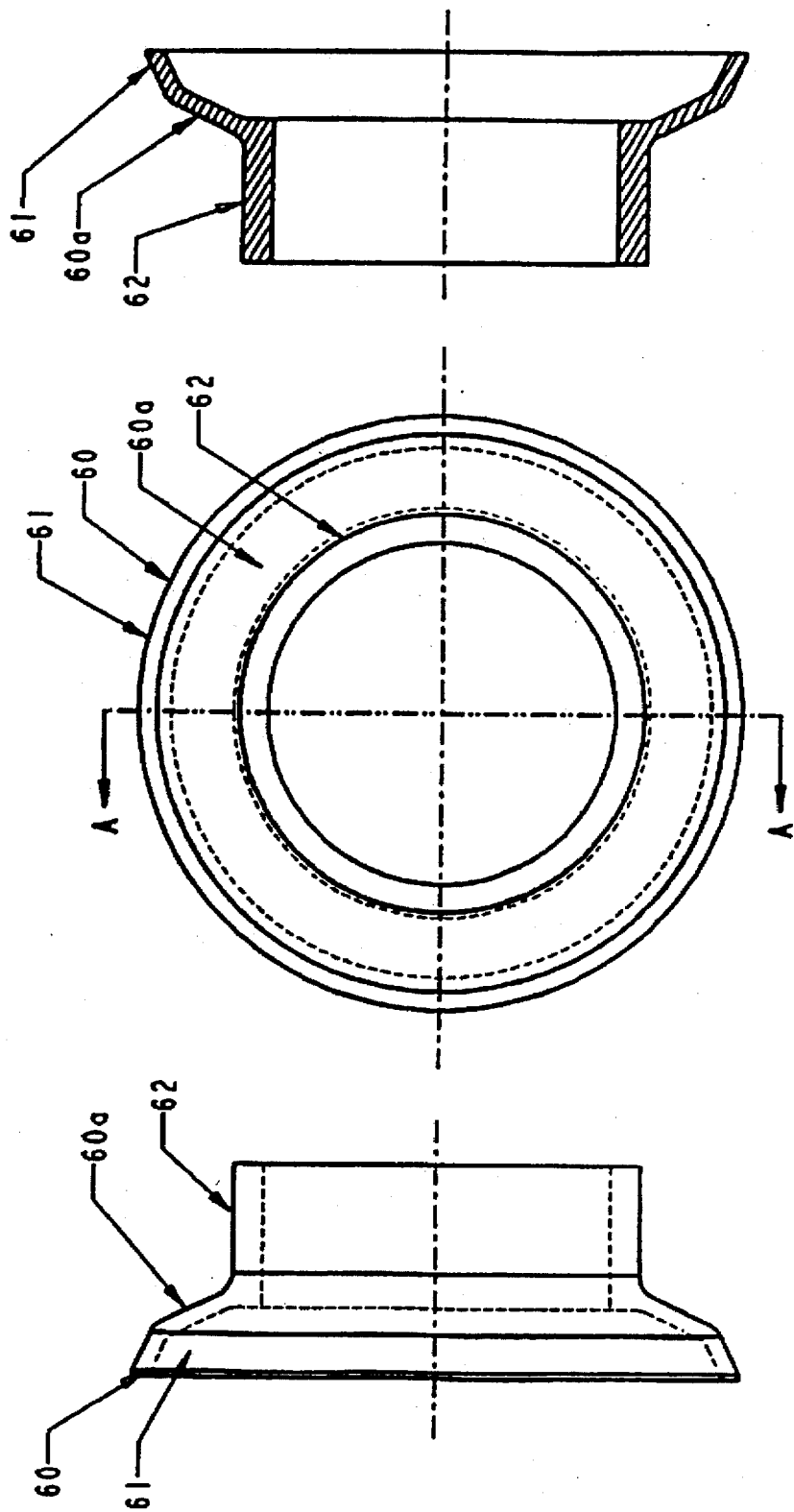

5,685,330

DIVERTER VALVES WITH INTEGRAL BACK FLOW PREVENTER AND INLET AND OUTLET CHECK VALVE MECHANISMS

FIELD OF INVENTION

This application relates to a diverter valve with integral, atmospheric type vacuum breaker and inlet and outlet check valves which finds particular application to deck mounted installations such as a roman tub.

BACKGROUND OF THE INVENTION

Back flow preventers are used in commercial and household installations, for example, bidets, Roman tubs, barber shop and hairdressing salon fixtures, laboratory sinks, food processing facilities, chemical manufacturing, metal plating facilities, just to name a few, to prevent the contamination of the potable water supply. The water in each case is used in different manners and the installation of back flow preventers and check valves would be required for each use to protect the water supply from contamination or a separate back flow preventer and check valve would be installed in the line in advance of the components in the system. For example, in a bidet, the water is diverted to the rim or the spray. In a soaking or whirlpool bath tub the water is diverted to the spout, shower head or removable handheld shower. A number of proposals have been made for the diversion of fluids. Various methods and devices have been used to protect the potable water system from contamination. The premises may be isolated to protect the purveyor's water distribution system by installing a back flow preventer at the water line into the building. An area may be isolated when a portion of the building has toxic material used there. That portion of the building should be isolated by installing a back flow preventer so as to protect the individual using the water within the building. Finally one may individually isolate each fixture or piece of equipment from the water system such as is the case in Applicant's own structure described in Canadian Patent 1,225,006 which provides back flow prevention, in a compact, easily manufactured, effective unit. The present invention describes improvements thereto by adding a plurality of checking devices and improves the structure and repair of the diverting valve.

It is therefore an object of this invention, to provide a diverter valve with, integral atmospheric type vacuum breaker and inlet and outlet check valves in an integral structure which is entirely reliable and easily serviced.

Further and other objects of the invention will be realized by those skilled in the art from the following summary of the invention and detailed description of preferred embodiments thereof.

SUMMARY OF THE INVENTION

According to a primary aspect of the invention, there is provided a diverter valve with integral back flow preventer and inlet and outlet check valves comprising a housing having two ends, one end for receiving a valve cartridge in use and preferably having detents provided proximate that end, the housing having an outer wall and an inner wall, the inner wall defining an opening extending from proximate one end to proximate the other end of the housing, the housing having an inlet port, preferably extending from one end of the housing toward the cartridge receiving end of the housing and into the housing opening, the housing having at least two outlet ports, preferably extending through the housing from the outer wall to the inner wall into said housing opening, preferably said at least two outlet ports being directed on the same plane and opening into the housing opening; a stationary body sleeve having a first end and preferably having detents disposed proximate the first end for locking a preferred retaining ring in position and a second end and an inner and outer wall defining a chamber, the second end of the body sleeve for insertion within the housing opening to proximate the inlet port in use, the body sleeve having an integral inlet tube within the chamber in communication with the inlet port of the housing in use and extending a predetermined distance in the chamber from the inlet port of the housing towards the cartridge receiving end of the housing and beyond the first end of the body sleeve to an open end, the open end of the inlet tube having disposed therewith a check to allow flow out of the open end but not back into the open end of the inlet tube, the chamber of body sleeve being defined by the outer wall of the inlet tube and the inner wall of the body sleeve, the body sleeve having disposed therewith openings extending from the chamber to the outer wall of the body sleeve and in direct communication with the at least two outlet ports of the housing, some of the openings of the body sleeve being provided with a check which allows flow out from the chamber toward the ports of the housing but prevents any flow from the ports to the chamber, in a preferred embodiment at least one of said openings further comprise a plurality of radially disposed small openings working in cooperation with a check which is preferably a disk shaped seal with integral seal portions proximate the circumference thereof to seat within the outer wall of the body sleeve and having a central opening to allow flow from the plurality of radially disposed small openings from the chamber to the housing outlet ports, and having a sealing surface disposed proximate each of the plurality of radially disposed openings to prevent any flow from the outlet ports of the housing to the chamber; a moveable diverting stem having a first open end and a second vented end wherein a handle is disposed in use and having an inner and outer wall, preferably the outer wall having provided therewith a detent for engagement with a stop of the preferred retaining ring which retains the moveable diverting stem and stationary body sleeve in engagement with one another, the first and second ends of the moveable stem providing therebetween a hollow wherein is disposed the open end of the inlet tube and the check thereof in use, preferably the check further comprising a resilient member tapering outwardly away from the inlet tube toward the inner wall of the moveable stem thereby allowing flow from the inlet tube to the chamber yet preventing flow from the chamber into the open end of the inlet tube, the first end of the stem for insertion within the chamber of the stationary body sleeve, surrounding the integral inlet tube, to proximate the end of the inlet tube proximate the inlet port of the housing, the diverting stem having disposed proximate the first open end a single opening (preferably provided with a seat for a seal surrounding the opening) for selected communication with the openings of the stationary body sleeve; a closure reciprocal from a position spaced from the open end of the inlet tube and check closing the upper end of the diverter valve to the atmosphere, to a position closing the inlet tube of the diverter valve to atmosphere, whereby when fluid is fed through the inlet tube into the valve the closure is moved away from the open end of the inlet tube closing the valve to atmosphere to permit the fluid to pass out the open end of the inlet tube into the valve, and when fluid is not passed through the inlet tube, the closure closes the open end of the inlet tube and vents the valve to atmosphere, wherein when assembled the stem sleeve maybe selectively moved to communicate the single opening of the stem sleeve with the openings of the stationary body sleeve and fluid will flow to the selected outlet port of the housing, for example to a spout, showerhead or removable handheld shower.

According to another aspect of the invention, there is provided a diverter valve with integral atmospheric type vacuum breaker and inlet and outlet check valves and for connection to a faucet or other valve which faucet or other valve controls water flow to the diverter valve, a housing having two ends, one end for receiving a valve cartridge in use and having detents provided proximate that end, the housing having an outer wall and an inner wall, the inner wall defining an opening extending from proximate one end to proximate the other end of the housing, the housing having an inlet port, preferably extending from one end of the housing toward the cartridge receiving end of the housing and into the housing opening, the housing having at least two outlet ports, preferably extending through the housing from the outer wall to the inner wall into said housing opening, preferably said at least two outlet ports being directed on substantially the same plane and opening into the housing opening; a stationary body sleeve having a first end preferably having detents disposed proximate the first end preferably for locking a retaining ring in position and a second end and an inner and outer wall defining a chamber, the second end of the body sleeve for insertion within the housing opening to proximate the inlet port in use, the body sleeve having an integral inlet tube within the chamber in communication with the inlet port of the housing in use and extending a predetermined distance in the chambers from the inlet port of the housing towards the cartridge receiving end of the housing and beyond the first end of the body sleeve to an open end, the open end of the inlet tube having disposed therewith a check to allow flow out of the open end but not back into the open end of the inlet tube, the chamber of body sleeve being defined by the outer wall of the inlet tube and the inner wall of the body sleeve, the body sleeve having disposed therewith openings extending from the chamber to the outer wall of the body sleeve and in direct communication with the least two outlet ports of the housing, the openings of the body sleeve being provided with a check which allows flow out from the chamber toward the outlet ports of the housing but prevents any flow from the outlet ports to the chamber, in a preferred embodiment said openings further comprise a plurality of radially disposed small openings working in cooperation with a check which is preferably a disk shaped seal with integral seal proximate the circumference thereof to seat within the outer wall of the body sleeve and having a central opening to allow flow from the plurality of radially disposed small openings from the chamber to the housing outlet ports, and having a sealing surface disposed proximate each of the plurality of radially disposed openings to prevent any flow from the outlet ports of the housing to the chamber; a moveable diverting stem having a first open end and a second vented end wherein a handle is disposed in use and having an inner and outer wall, preferably the outer wall having provided therewith a detent for engagement with a stop of the preferred retaining ring which retains the moveable diverting stem and stationary body sleeve in engagement with one another, the first and second ends of the moveable stem providing therebetween a hollow wherein is disposed the open end of the inlet tube and the check thereof, preferably the check further comprising a resilient member tapering outwardly away from the inlet tube toward the inner wall of the moveable stem thereby allowing flow from the inlet tube to the chamber yet preventing flow from the chamber into the open end of the inlet tube, the first end of the stem for insertion within the chamber of the stationary body sleeve, surrounding the integral inlet tube, to proximate the end of the inlet tube proximate the inlet port of the housing, the diverting stem having disposed proximate the first open end a single opening (preferably provided with a seat for a seal surrounding the opening) for selected communication with the openings of the body sleeve; a closure reciprocal from a position spaced from the open end of the inlet tube and check closing the upper end of the diverter inlet tube of the diverter valve to the atmosphere, to a position closing the inlet tube valve of the diverter valve to atmosphere, whereby when fluid is fed through the inlet tube into the valve the closure is moved away from the opening in the inlet tube closing the valve to atmosphere to permit the fluid to pass out the opening of the inlet tube into the valve, and when fluid is not passed through the inlet tube, the closure closes the open end of the inlet tube and vents the valve to atmosphere, wherein when assembled the stem sleeve maybe selectively moved to communicate the single opening of the stem sleeve with the openings of the stationary body sleeve and fluid will flow to the selected outlet, for example to a spout, showerhead or removable handheld shower.

According to another aspect of the invention, the moveable stem may further comprise a tube having an outer surface whose dimensions correspond substantially to the inner surface dimensions of the inner wall of the body sleeve defining the chamber and providing an intimate close tolerance fit therebetween yet allowing movement of the stem within the body sleeve.

According to yet another aspect of the invention there is provided a cartridge for a valve housing having outlets, the cartridge comprising a stationary body sleeve for fixed insertion within the housing and having outlet ports permanently aligned with the outlets of the housing, a moveable substantially hollow stem sleeve inserted within the stationary body sleeve and having an opening selectively alignable with the ports of the stationary body sleeve, the body sleeve and hollow stem being connected to one another by a retaining ring which aligns and maintains the cartridge as a unit in the housing. Preferably the retaining ring includes stops to limit the travel of the moveable hollow stem and preferably engageable with a detent provided with the exterior of the hollow stem. preferably the housing and the retaining ring include detent portions to fix the position of the body sleeve with respect to the housing while allowing motion of the moveable stem within the limits of the stops provided. In a preferred embodiment the cartridge, and the cartridge components are structured substantially as described in the first two paragraphs of this summary of invention.

According to yet another aspect of the invention, there is provided a diverter valve with integral vacuum breaker back flow preventer and inlet and outlet check valves comprising a housing having two ends, one end for receiving a valve cartridge in use, the housing having an outer wall and an inner wall, the inner wall defining an opening extending from proximate one end to proximate the other end of the housing, the housing having an inlet port, the housing having at least two outlet ports; a stationary body sleeve having a first end and a second end and an inner and outer wall defining a sleeve opening, the second end of the body sleeve for insertion within the housing opening to proximate the inlet port in use, the body sleeve having an inlet within the sleeve opening in communication with the inlet port of the housing and extending a predetermined distance in the sleeve opening from the inlet port of the housing towards the cartridge receiving end of the housing to an open end, the inlet port having disposed therewith a check to allow flow from the inlet port but not back to the inlet port, the body sleeve having disposed therewith openings extending from the sleeve opening to the outer wall of the body sleeve and in direct communication with the at least two outlet ports of the housing, some of the openings of the body sleeve having been provided with a check which precludes reversal of flow into the valve; a moveable diverting stem having a first open end and a second vented end wherein a handle is disposed in use and having an inner and outer wall, the first and second ends of the moveable stem providing therebetween a hollow stem chamber wherein is disposed the waterway in use, the first end of the diverting stem for insertion within the sleeve opening of the stationary body sleeve, to proximate the inlet port of the housing, the diverting stem having disposed proximate the first open end a single opening for selected communication with the openings of the stationary body sleeve; a closure moveable from a position spaced from the open end of the stem chamber closing the upper end of the diverter valve to the atmosphere, to a position closing the stem chamber of the diverter valve to atmosphere, whereby when fluid is fed through the valve the closure is moved away from the open end of the stem chamber closing the valve to atmosphere to permit the fluid to pass into the valve, and when fluid is not passed through the stem chamber, the closure opens the open end of the stem chamber to atmosphere and vents the valve to atmosphere, wherein when assembled the stem may be selectively moved to communicate the single opening of the stem with the openings of the stationary body sleeve and fluid will flow to the selected outlet port of the housing, for example to a spout, showerhead or removable handheld shower.

The invention will now be illustrated with reference to drawings of embodiments of the invention.

BRIEF DESCRIPTION OF THE DRAWINGS

FIGS. 9, 9a, 9b, 9c, 9d, 9e, and 9f are various views of the retainer ring illustrating the various components thereof and shown in a preferred embodiment of the invention.

FIGS. 10, 10a, and 10b are side, top, and cut away views of the check valve for the inlet tube 42 which is illustrated in a preferred embodiment of the invention.

DETAILED DESCRIPTION OF PREFERRED EMBODIMENTS OF THE INVENTION

Figure 1:
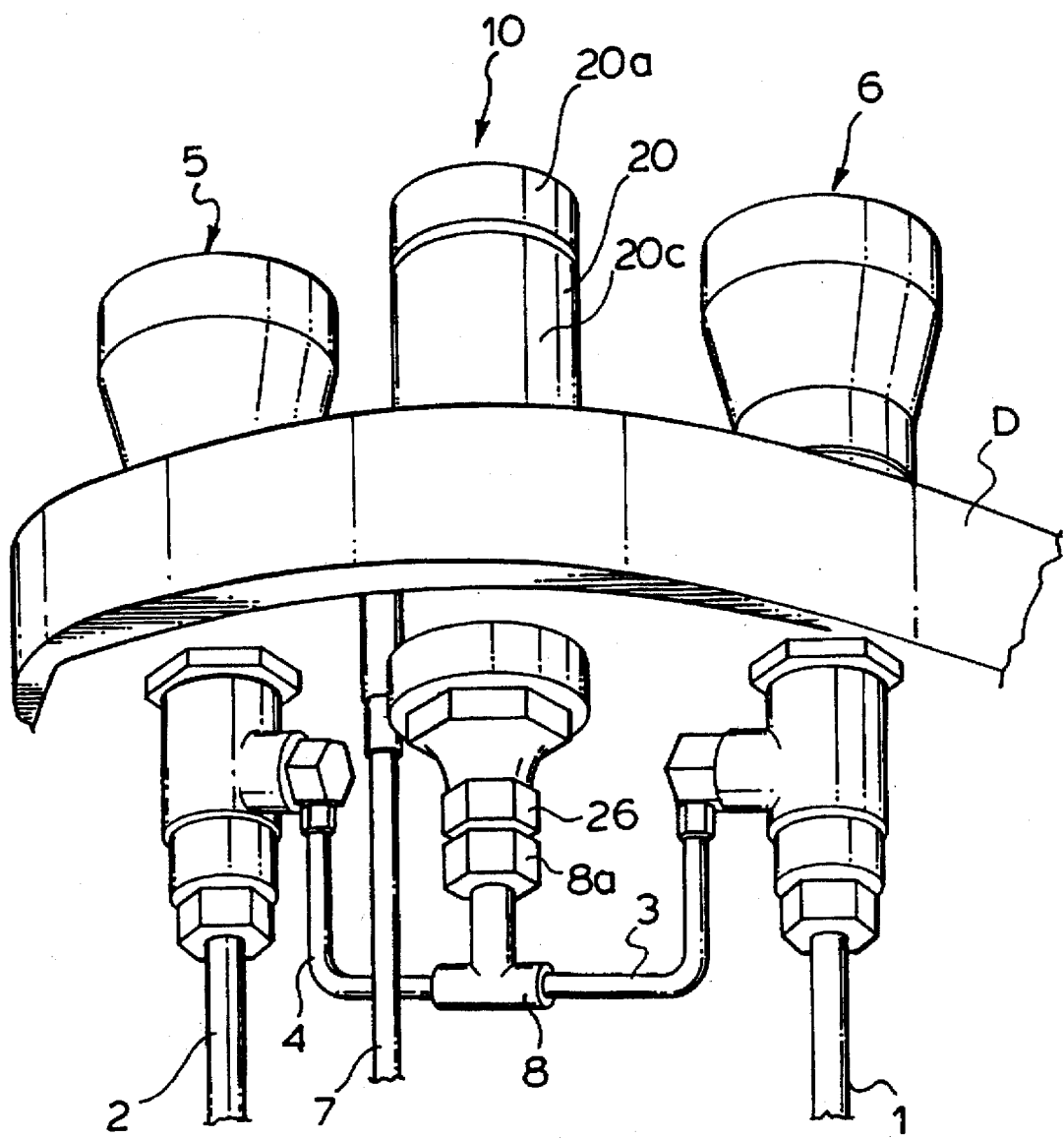
FIG. 1 is a general perspective view of the use of the Diverter Valve embodying the invention and illustrated in a preferred embodiment of the invention.

Similarly as taught in my Canadian Patent 1,225006 there is illustrated a Diverter Valve 10 which is installed on for example a deck D for a roman tub to receive hot and cold water from valve mechanisms 5 and 6 which provide hot or cold water and variations of the flow and mixtures thereof to the diverting valve 10. For this example valve 5 will supply hot water and valve 6 will supply cold water. Therefore the supply tubing 1 and 2 are providing cold water into the bottom of faucet valve 6 and hot water into the bottom of faucet valve 5. Cold and hot water are therefore inlet to the bottom of the Diverting Valve 10 via tubes 3 and 4 and fitting 8 to inlet coupling 8a and inlet 26 of the housing 20 of the Diverting Valve 10. By rotating the handle 20a of the housing 20 the user may select with this embodiment one of three positions; a spout to the tub (not shown), a fixed wall shower head (not shown), a supply tubing 7 extending to a hand held shower unit, (also not shown). Alternatively any other alternative fixtures may be provided for which back flow prevention is desired.

Figure 2:
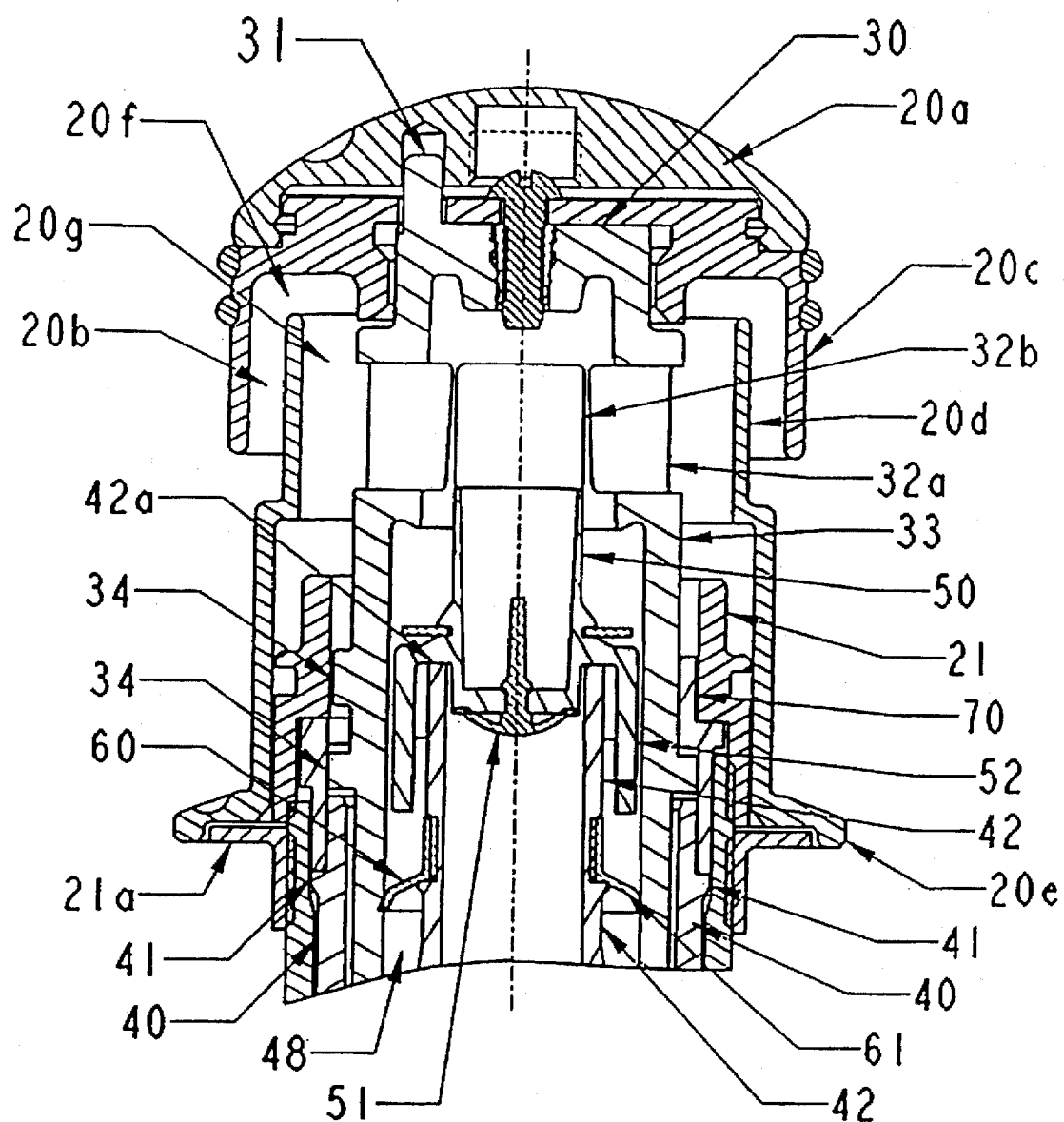
FIGS. 2 and 3 are cut away sectional views of the components making up the diverter valve and illustrated in a preferred embodiment of the invention.
Figure 3:
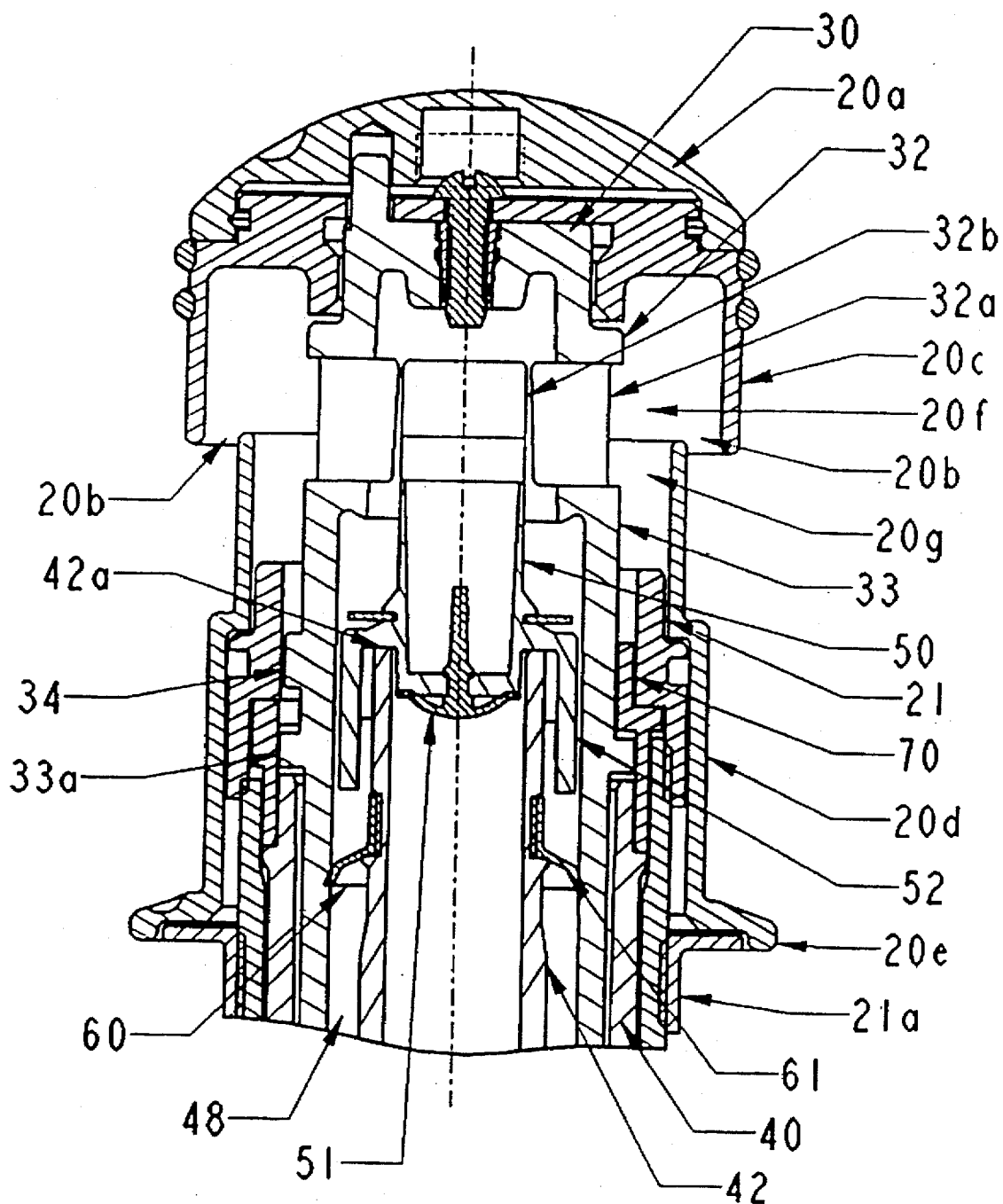
Figure 4:
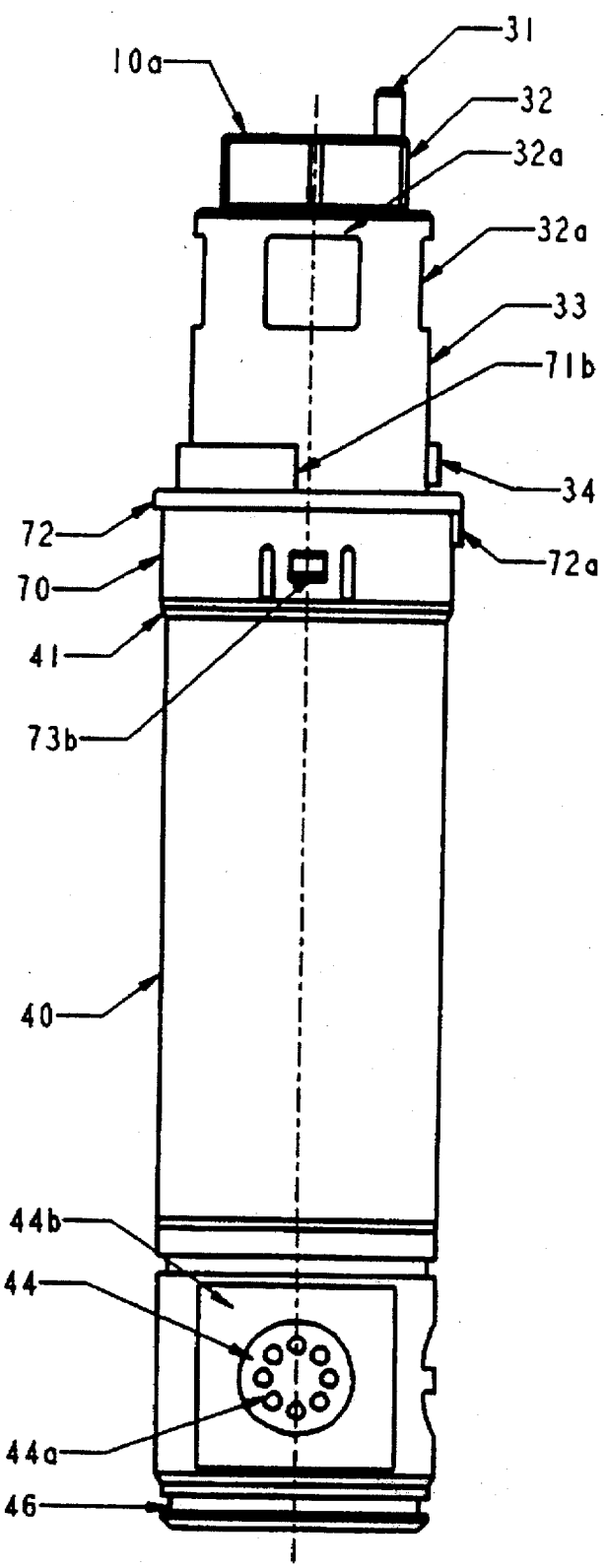
FIGS. 4, 4a, and 4b are illustrations of the cartridges installed in the Diverter Valve illustrating the various outlet positions of the cartridge and illustrated in a preferred embodiment of the invention.
Figure 4A:
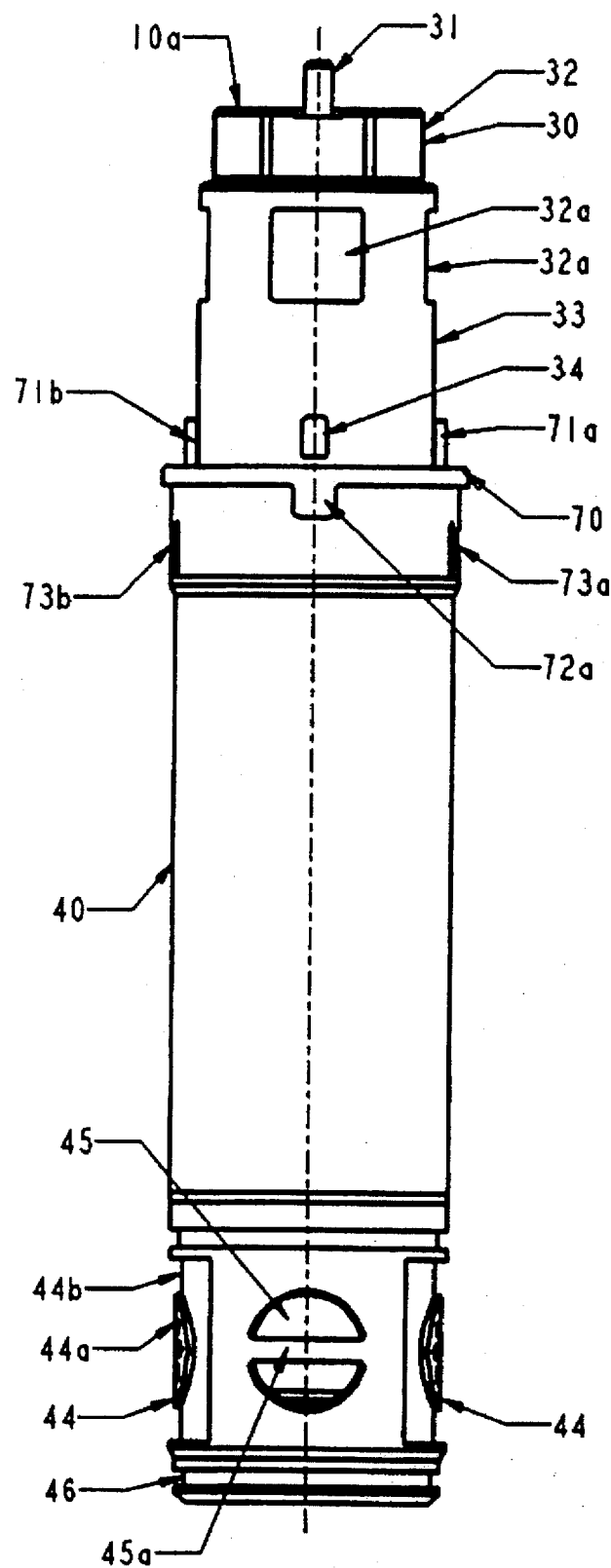
Figure 4B:
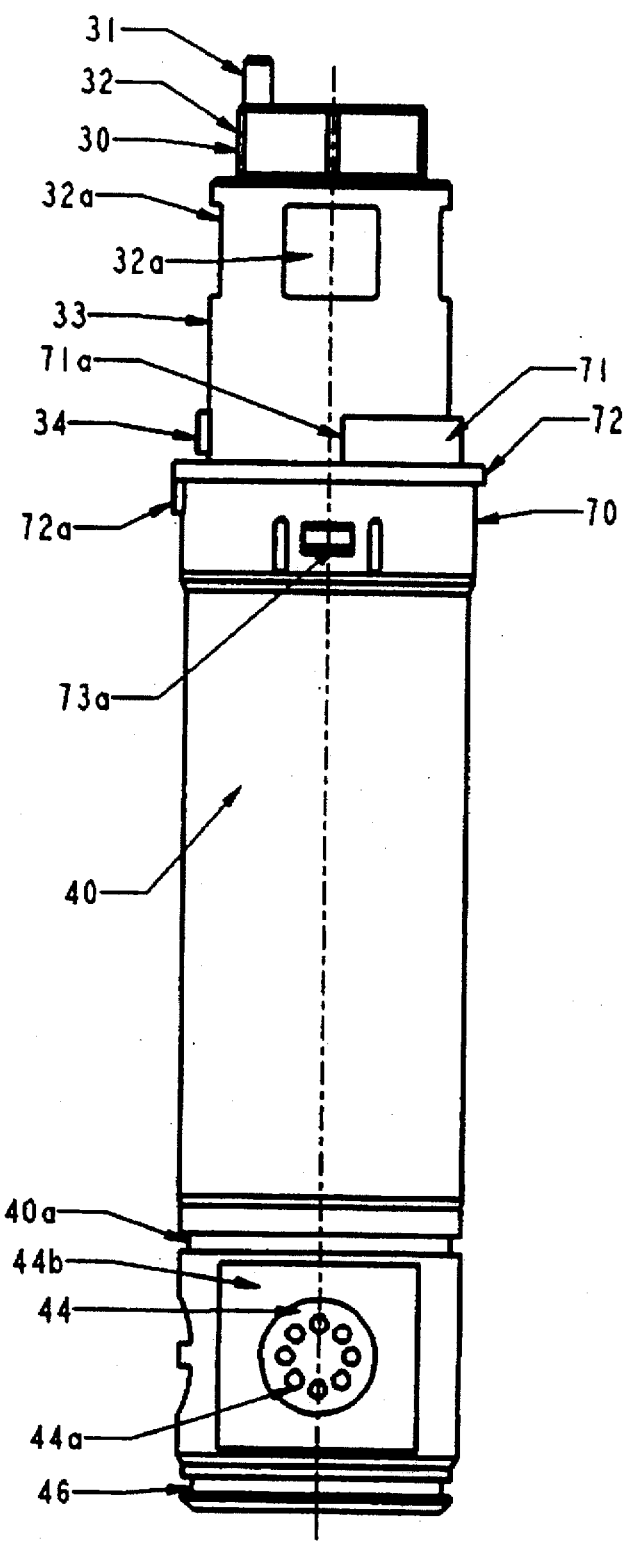

Referring now to FIGS. 2 and 3 there is illustrated the installation of the components of the handle and the assembly of the trim for the valve and the components of the valve. Therefore there is provided a control handle 20a attached to the Diverting stem 30 having an engaging portion 31 which engages with the opening proximate the bottom of the handle portion 20a as shown. The handle portion 20a includes venting portions 20f to allow the valve to vent to atmosphere when not in operation. To enable this to occur a float 50 is provided which is moved from a position as illustrated closing the inlet tube 42 of the stationary body sleeve 40 of the valve assembly to a position closing the vent 32b of the valve assembly thereby allowing water into the chamber 48. The Diverting stem 30 therefore is moveable within the stationary body sleeve 40 which are held together as an integral package by a retaining ring 70 as best seen in FIGS. 4, 4a, and 4b. A trim portion 20d extends down to flange portion 21a covering thereover via flange portion 20e to provide the proper trim for the Diverting valve 10. Integral with the handle portion is a downwardly depending skirt 20c which covers the diverting stem 20 and provides for a venting chamber 20f and 20g which vents the cartridge via the windows 32a through the passage 20g, 20f, and 20b out to atmosphere thereby providing a vacuum breaking path. This path of course is closed by the top of float 50 via the movement and sealing of the float 50 in relation to the above mentioned passage as will be described here in after.

The inlet tube 42 therefore is provided with a one way check mechanism 60 proximate the top thereof which is located at a predetermined position below the top end 32a of the inlet tube to allow proper functioning of the float mechanism 50 and to provide checking of the fluid flowing from the top of tube 42 to the passage 48 between the tube 42 and the inner wall 40d of the stationary sleeve 40.

Therefore the fluid will pass one way down into the chamber 48 but will not pass back from the chamber 48 back into the inlet tube 42 thereby providing a check mechanism and protection for the inlet water.

Figure 5:
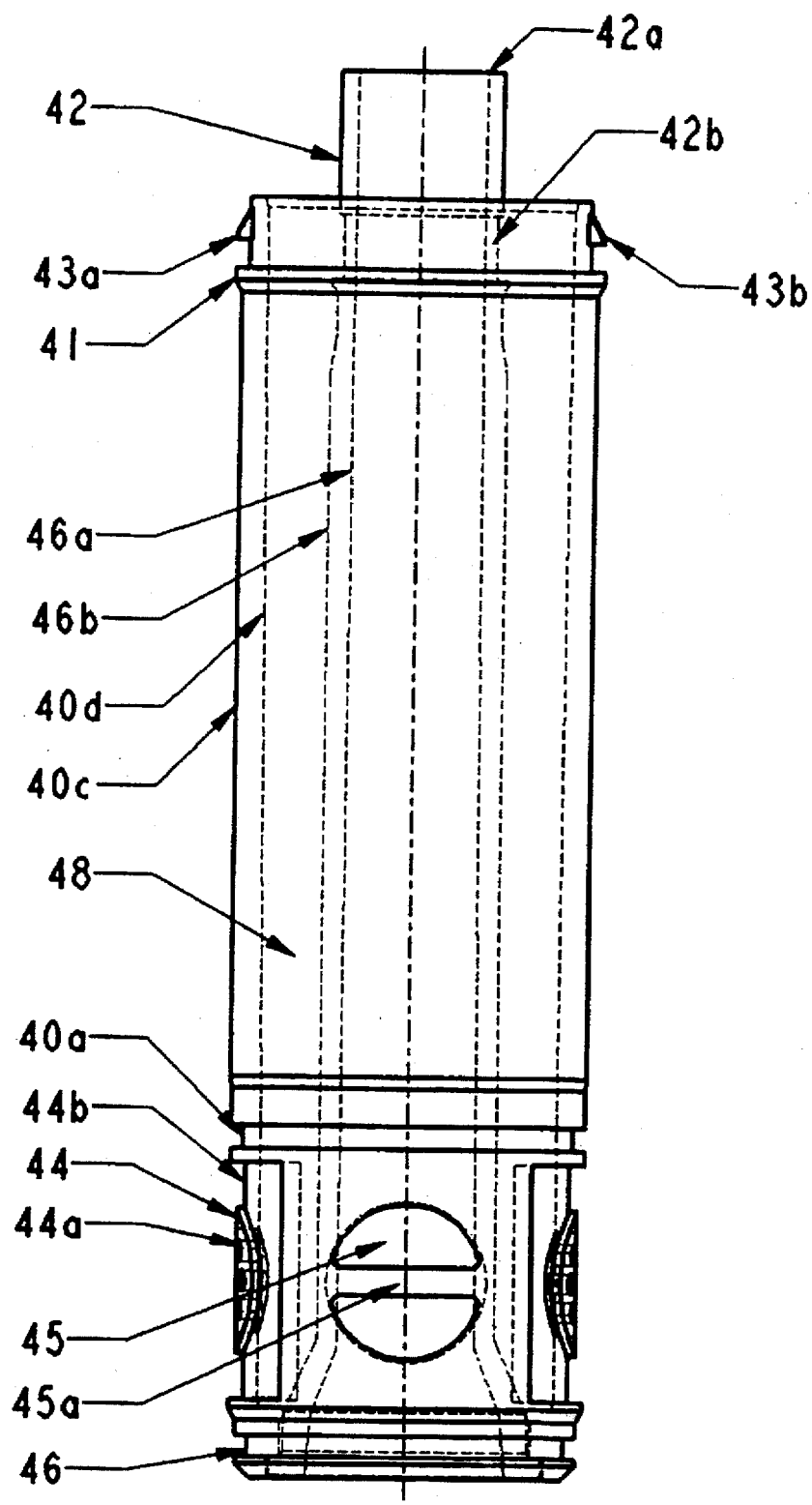
FIGS. 5 and 5a are illustrations of the stationary body sleeve and inlet tube illustrating the various outlets of the body sleeve and illustrated in a preferred embodiment of the invention.
Figure 5A:
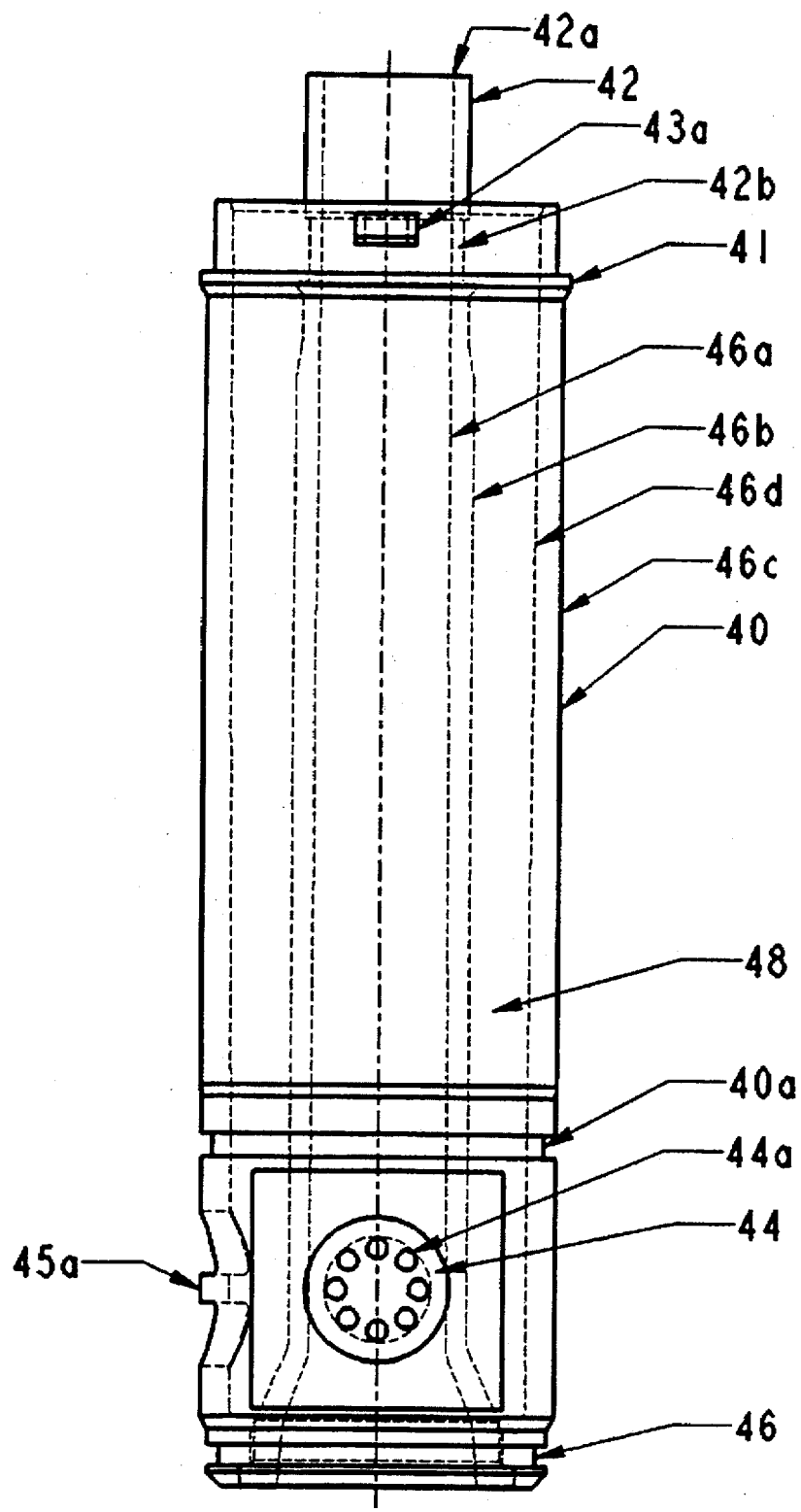

Referring now the FIGS. 4, 4a, and 4b there is illustrated the cartridge 10a of the Diverter Valve 10 comprising the moveable Diverting Stem 30 moveable within the stationary body sleeve 40 and being retained together by retaining portion 70 having locking portions 73b and 73a which engage with tabs 43a and 43b respectively of the body sleeve as best seen in FIG. 5 and 5a. The locking ring, as best seen in FIG. 9, and FIGS. 9a through 9f, includes an opening portion 70a to allow the locking ring to rest on the flange 41 of the stationary body sleeve 40 under the flange portion 72 after the opening 70a allows passage of detent 34 through said opening 70a during assembly thus allowing the bottom of flange 72 to rest on flange 41. The opening 73b will engage with the tab portion 43b and the opening 73a will engage with the tab portion 43a.

Figure 12A:
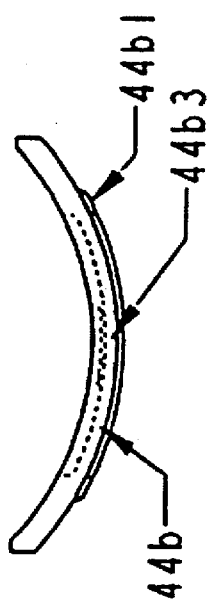
FIGS. 12 and 12a shows the generally flat disk design for the check mechanism enclosing the openings 44a of the stationary body sleeve 40 and illustrated in a preferred embodiment of the invention.
Figure 12:
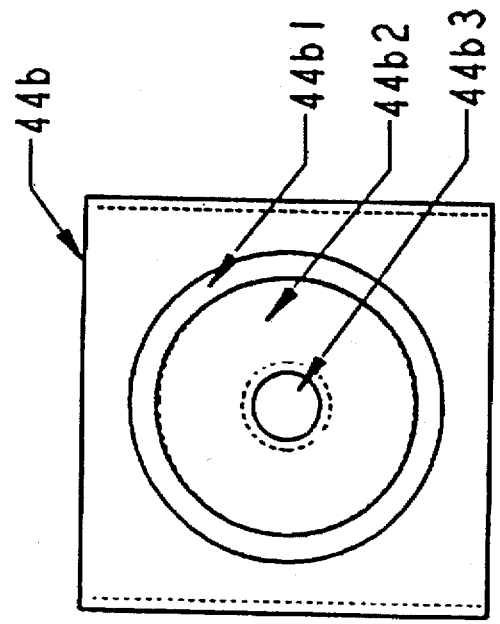

An opening 32a provided proximate the top of stem 30 allows venting of the valve as described in relations to FIGS. 2 and 3. The stem 30 therefore is moveable within the body 40 within the limits of the detent 34 and the locking ring 70 as provided by stops 71b an 71a. These positions therefore provide a full range of selectivity from the openings 44 and the single opening 45. The openings 44 are provided for shower outlets and have reduced volume in relation to opening 45 which includes the reinforcing bar 45a to retain the seal from collapsing into the opening 45 as best seen in FIG. 6a or from sliding through the opening 45 when the Diverting valve is operated. Typically the opening 45 would lead to the spout for the Roman tub whereas the multiplicity of openings 44a would lead to a shower or a telephone shower. A unique check valve 44b is provided, as best seen in FIGS. 12 and 12a, which seats in the seating provided around the opening 44a via the ring 44b(1) provided with the gasket 44b. When water comes out of opening 44a it will pass through opening 44b(3) of the check valve 44b. However any water attempting to backup into the outlet will be prevented by the occluded face 44b(2) of the one way check valve provided. As best seen in FIG. 6a a single outlet is provided from the Diverting stem which is typically sealed by an "O" ring 35a. Therefore this single outlet is aligned selectively with the outlets 25, 27 or 28 when water is inlet into the valve through inlet 26.

Referring to FIGS. 5 and 5a the stationary body sleeve is illustrated having an inlet tube integral therewith at 42 having a top at 42a and a check receiving portion 42b wherein the check 60 is positioned as best seen in FIG. 6a. The stationary body 40 therefore has an outer diameter 40c an inner diameter 40d a gasket receiving portion 40a, and an opening 44, 45 and 46 as previously described. The inlet tube has an inner diameter 46a an outer diameter 46b. The inner diameter 40d of the outer body 40 and the outer diameter 46b of the inlet 42 defines a chamber 48a where water will pass from the outlet 42a of the inlet tube to the chamber passing the check valve 60 (but not passing back to the inlet tube) and then selectively out of one of the openings 44 or 45 and 28, 27, or 25 of the housing 20. This can be best seen in relation to FIGS. 7, 7a and 7b and the reader is referred to these figures in relations to the aforementioned paragraph.

Figure 6:
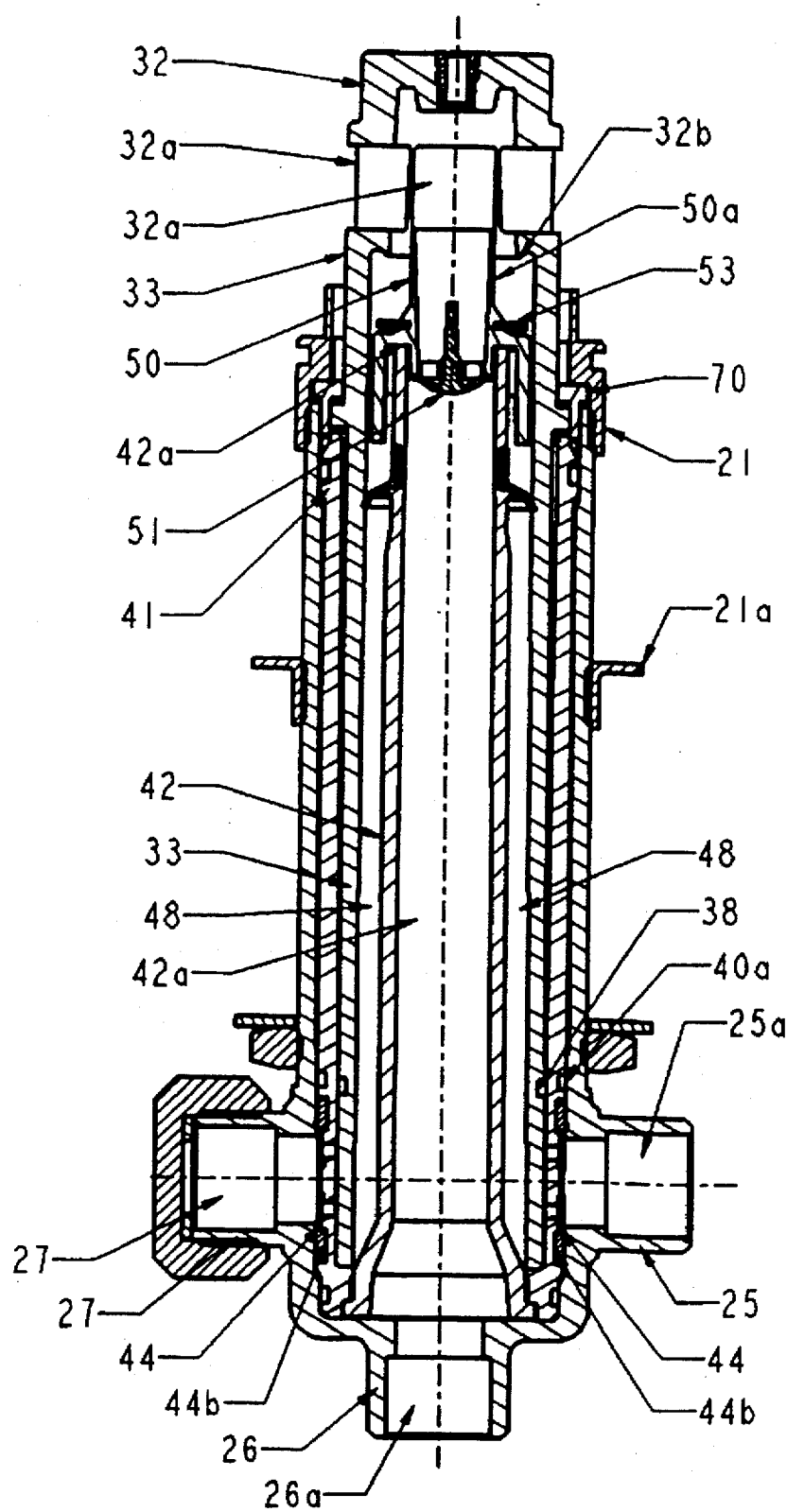
FIGS. 6 and 6a are cross sectional views of the entire assembly of the Diverter Valve and illustrated in a preferred embodiment of the invention.
Figure 6A:
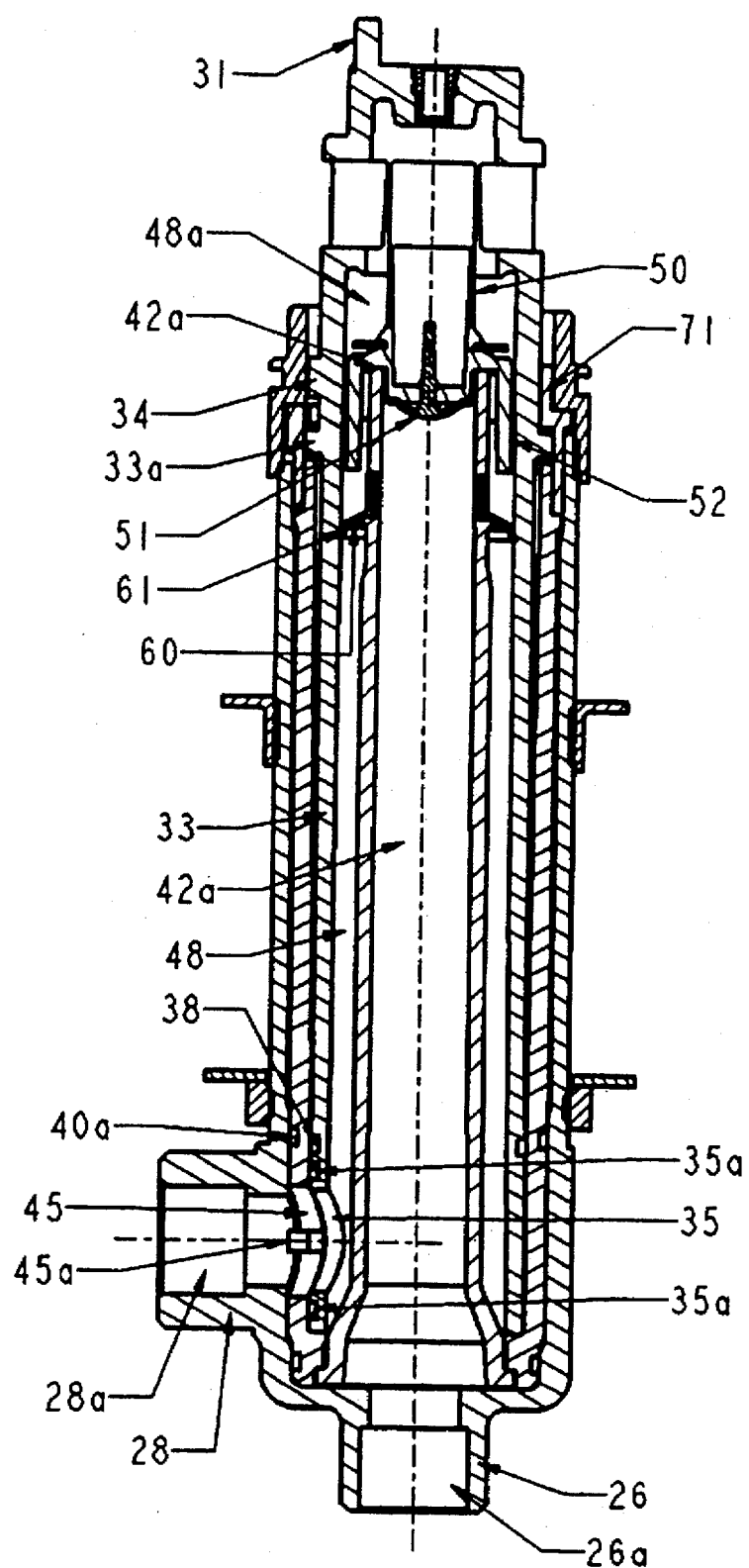
Figure 7:
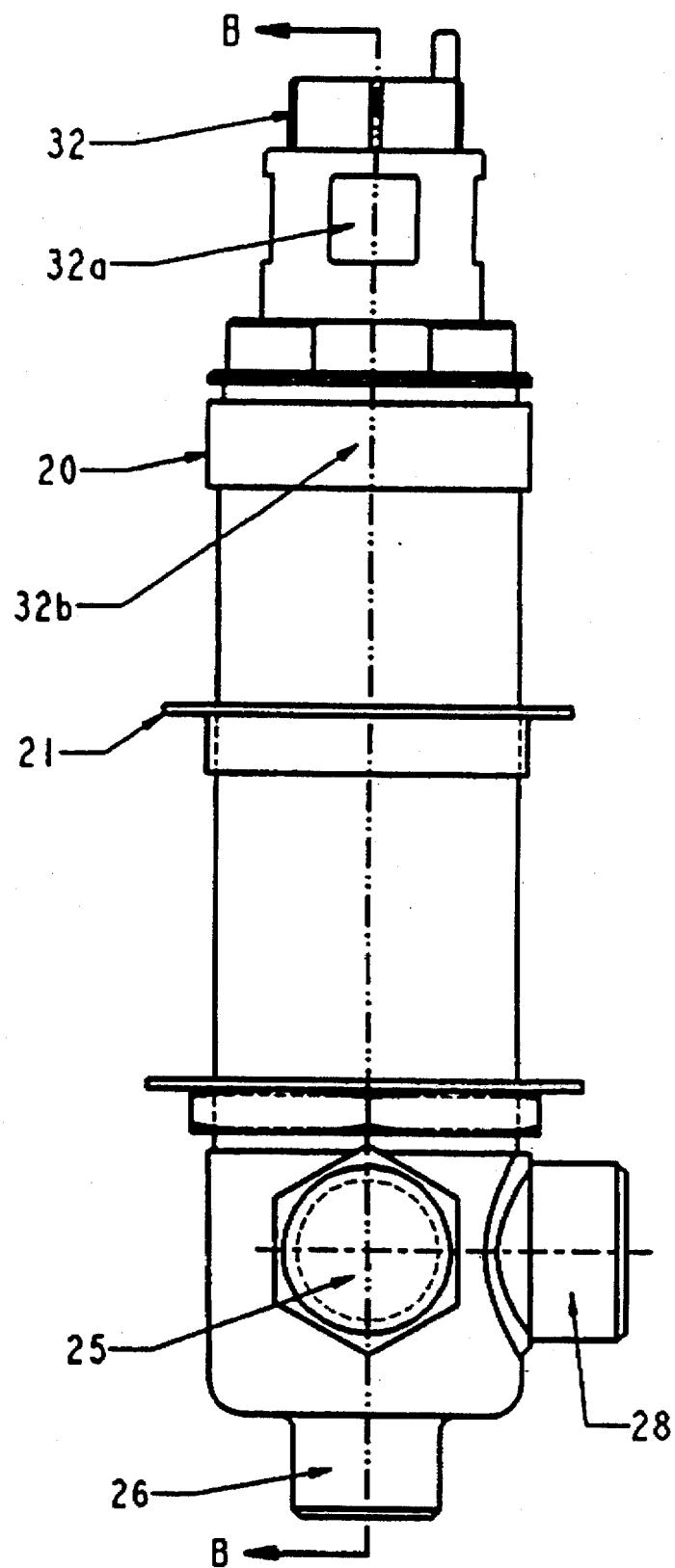
FIGS. 7, 7a and 7b are illustrations of the assembled cartridge and housing of the Diverter Valve showing the various outlets from the valve and illustrated in a preferred embodiment of the invention.
Figure 7A:
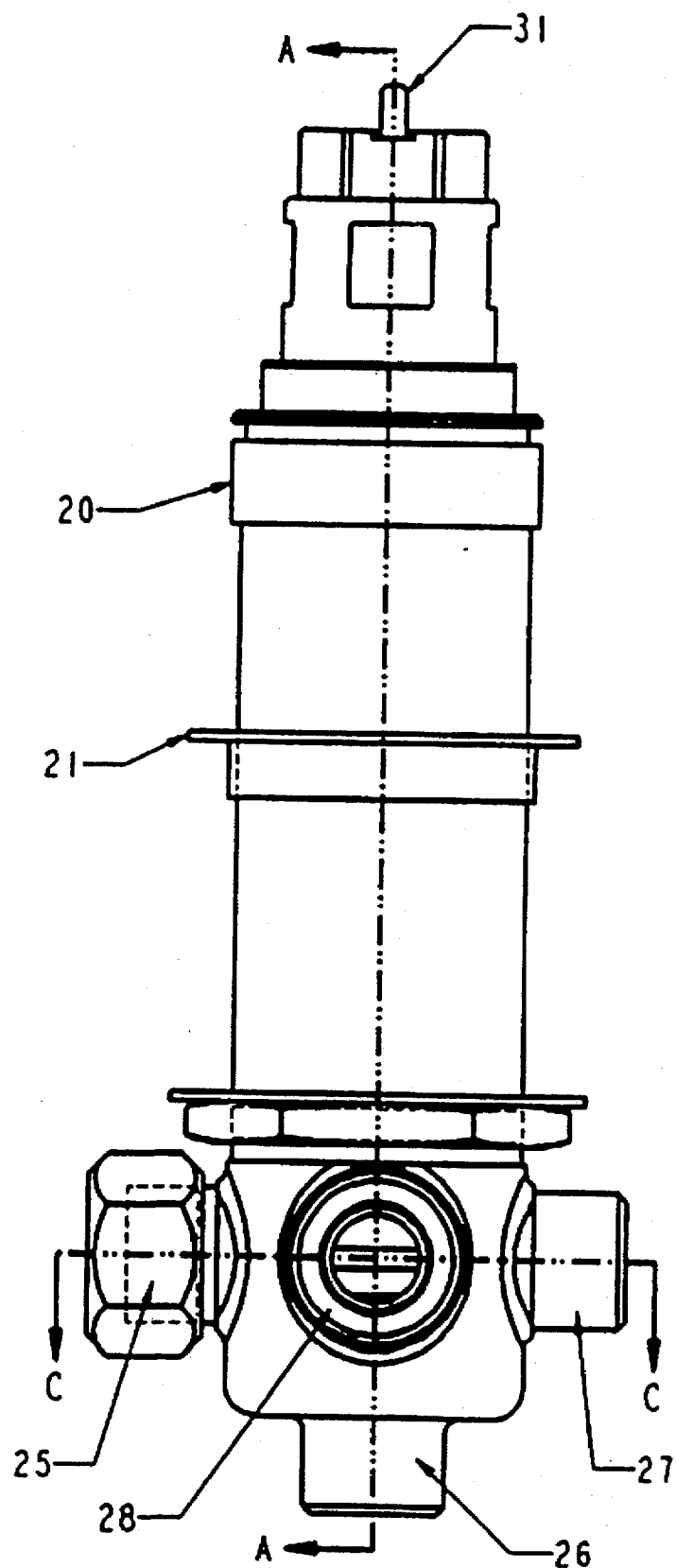
Figure 7B:
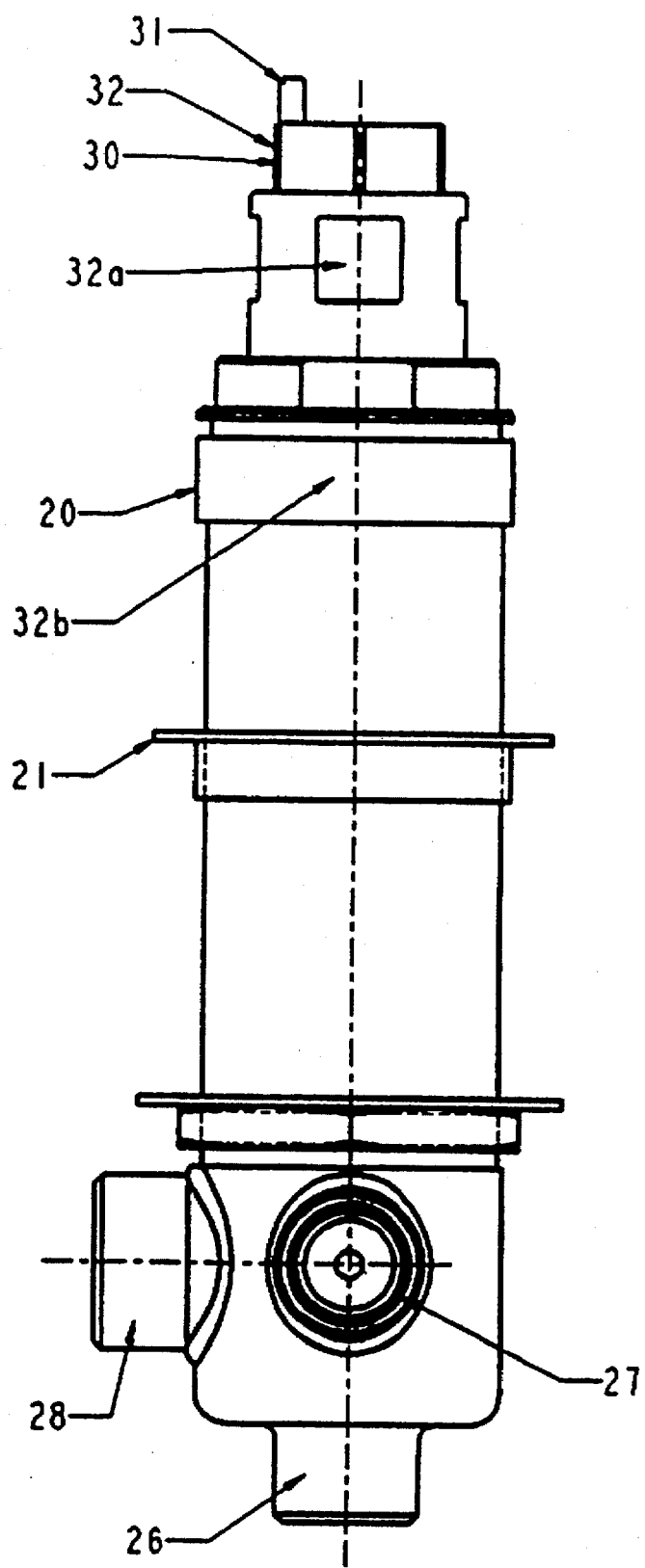
Figure 8:
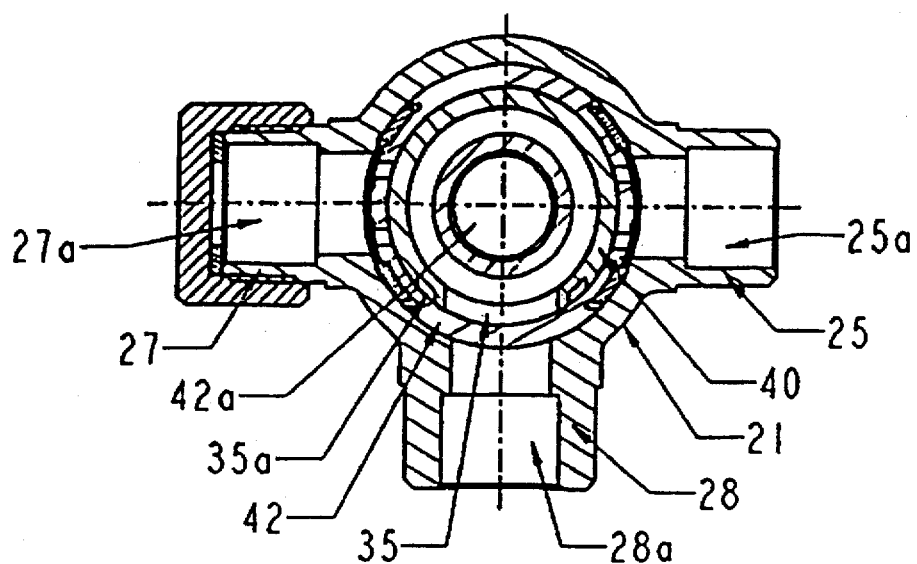
FIG. 8 is a top sectional view of the Diverter Valve assembly illustrated in a preferred embodiment of the invention.

Referring now to FIGS. 6 and 6a the entire assembly is illustrated in cross section with the stem 30 selecting the outlet 28 and the outlet 45 and therefore sending the water to the spout. The water will pass up the inlet tube to opening 6a, overflow by raising the vacuum breaker 50 so that portion 50a engages with opening 32b, sized to receive the flange or cylinder size 50a thereby closing the valve to atmosphere via the seal 52a raised against the bottom of the opening 32b thereby sealing the diverting valve from atmosphere and allowing water to pass over into the chamber 48a and selectively out of the valve. When a shower is selected typically there is a head of water retained in the shower feed pipe or telephone tubing. Since the telephone tubing is not always within the tub in a Roman tub it is preferred to prevent any dripping from the telephone shower onto for example the floor. Therefore a check valve is provided proximate the outlet as well to prevent water from passing fluid back into the valve from the telephone shower or the shower nozzle. As described in relation to FIGS. 12, 12a and FIG. 5a the vacuum breaker in essence works identically with the previously described vacuum breaker of my previous Canadian Patent 1,225,006 with the exception of of enhanced features of the float and the plug 51 providing a much tighter package. When water is shut off therefore from entering the valve the Diverter Valve float 51 will close the end of the inlet tube 42a and therefore allow the passage of air into the valve and thereby preventing creation of a vacuum in the valve with all the known problems that this may create.

Figure 9:
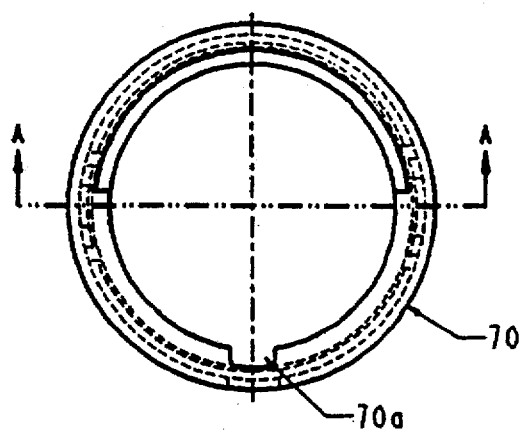
Figure 9A:
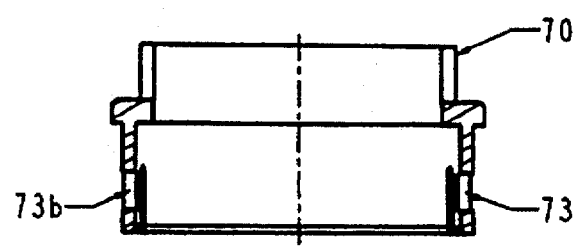

FIGS. 9 through 9f describe the retaining ring as previously described with all of the components thereof including an opening 70a and detents 71a and 71b, and detents 73a and 73b which engage with the cartridge as previously described.

Referring to FIGS. 10–10b there is described the unique check device provided as best seen in FIG. 6a which includes a substantially flexible material have a shape substantially shown having a tapering bottom portion 61 and a substantially more biased tapered form 60a and a substantially cylindrical section 62 which butts up against the detent portion 42b of the inlet tube 42. The slanting surfaces 60 and 61 therefore provide the checking and tight fit. The inner diameter of the moveable diverting stem 30 and the inlet tube providing an inlet chamber 48 by preventing the passage of the fluid back from the passage 48 to the inlet tube 42.

Figure 11:
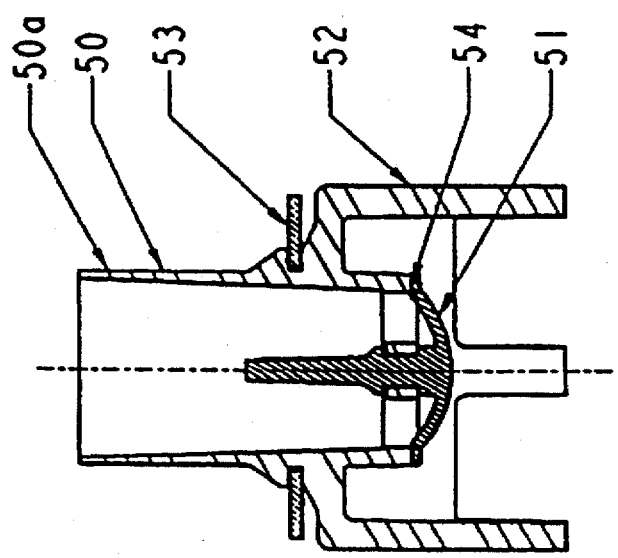
FIG. 11 is a cross sectional view of the float 50 proximate the top of the inlet tube 42 having a stopper 51 and illustrated in a preferred embodiment of the invention.

Referring to FIG. 11 there is described the float mechanism 50 having a tapered wall 50a in order to shut off the venting of the valve as previously described in cooperation with the seal 53 and shut off the top of the inlet tube via stop 51 and downwardly depending skirts 52. The float of course is sized to fit within the portions of the inlet tube at 54 and breather opening 42b at 50a.

Referring to FIGS. 12 and 12a as previously described there is provided the unique check mechanism 4 and 4b which retains in the opening 44 as best seen in FIG. 4b so that the face 44b(2) will prevent any fluid from re-entering the opening 44a but the opening 44b(3) will allow passage of the fluid from opening 44a to the selected outlet. It is recommended that the material for both the checks of FIGS. 10 and 12 be made from epdm 60 duro.

As many changes can be made to the preferred embodiments of the invention without departing from the scope of the invention; it is intended that all material contained herein be interpreted as illustrative of the invention and not in limiting sense.

The embodiments of the invention in which an exclusive property or privilege is claimed are as follows:

1. A diverter valve with integral back flow preventer and inlet and outlet check valves comprising a housing having two ends, one end for receiving a valve cartridge in use, the housing having an outer wall and an inner wall, the inner wall defining an opening extending from proximate one end to proximate the other end of the housing, the housing having an inlet port, the housing having at least two outlet ports; a stationary body sleeve having a first end and a second end and an inner and outer wall defining a chamber, the second end of the body sleeve for insertion within the housing opening to proximate the inlet port in use, the body sleeve having an integral inlet tube within the chamber in communication with the inlet port of the housing in use and extending a predetermined distance in the chamber from the inlet port of the housing towards the cartridge receiving end of the housing and beyond the first end of the body sleeve to an open end, the open end of the inlet tube having disposed therewith a check to allow flow out of the open end but not back into the open end of the inlet tube, the chamber of body sleeve being defined by the outer wall of the inlet tube and the inner wall of the body sleeve, the body sleeve having disposed therewith openings extending from the chamber to the outer wall of the body sleeve and in direct communication with the at least two outlet ports of the housing, some of the openings of the body sleeve being provided with a check which allows flow out from the chamber toward the ports of the housing but prevents any flow from the ports to the chamber; a moveable diverting stem having a first open end and a second vented end wherein a handle is disposed in use and having an inner and outer wall, the first and second ends of the moveable stem providing therebetween a hollow wherein is disposed the open end of the inlet tube and the check thereof in use, the first end of the stem for insertion within the chamber of the stationary body sleeve, surrounding the integral inlet tube, to proximate the end of the inlet tube proximate the inlet port of the housing, the diverting stem having disposed proximate the first open end a single opening for selected communication with the openings of the stationary body sleeve; a closure reciprocal from a position spaced from the open end of the inlet tube and check closing the upper end of the diverter valve to the atmosphere, to a position closing the inlet tube of the diverter valve to atmosphere, whereby when fluid is fed through the inlet tube into the valve the closure is moved away from the open end of the inlet tube closing the valve to atmosphere to permit the fluid to pass out the open end of the inlet tube into the valve, and when fluid is not passed through the inlet tube, the closure closes the open end of the inlet tube and vents the valve to atmosphere, wherein when assembled the stem sleeve maybe selectively moved to communicate the single opening of the stem sleeve with the openings of the stationary body sleeve and fluid will flow to the selected outlet port of the housing.

2. A diverter valve with integral atmospheric type vacuum breaker and inlet and outlet check valves and for connection to a faucet or other valve which faucet or other valve controls water flow to the diverter valve, a housing having two ends, one end for receiving a valve cartridge in use and having detents provided proximate that end, the housing having an outer wall and an inner wall, the inner wall defining an opening extending from proximate one end to proximate the other end of the housing, the housing having an inlet port, the housing having at least two outlet ports; a stationary body sleeve having a first end and a second end and an inner and outer wall defining a chamber, the second end of the body sleeve for insertion within the housing opening to proximate the inlet port in use, the body sleeve having an integral inlet tube within the chamber in communication with the inlet port of the housing in use and extending a predetermined distance in the chambers from the inlet port of the housing towards the cartridge receiving end of the housing and beyond the first end of the body sleeve to an open end, the open end of the inlet tube having disposed therewith a check to allow flow out of the open end but not back into the open end of the inlet tube, the chamber of body sleeve being defined by the outer wall of the inlet tube and the inner wall of the body sleeve, the body sleeve having disposed therewith openings extending from the chamber to the outer wall of the body sleeve and in direct communication with the least two outlet ports of the housing, the openings of the body sleeve being provided with a check which allows flow out from the chamber toward the outlet ports of the housing but prevents any flow from the outlet ports to the chamber; a moveable diverting stem having a first open end and a second vented end wherein a handle is disposed in use and having an inner and outer wall, the first and second ends of the moveable stem providing therebetween a hollow wherein is disposed the open end of the inlet tube and the check thereof, the first end of the stem for insertion within the chamber of the stationary body sleeve, surrounding the integral inlet tube, to proximate the end of the inlet tube proximate the inlet port of the housing, the diverting stem having disposed proximate the first open end a single opening for selected communication with the openings of the body sleeve; a closure reciprocal from a position spaced from the open end of the inlet tube and check closing the upper end of the diverter valve to the atmosphere, to a position closing the inlet tube of the diverter valve to atmosphere, whereby when fluid is fed through the inlet tube into the valve the closure is moved away from the opening in the inlet tube closing the valve to atmosphere to permit the fluid to pass out the opening of the inlet tube into the valve, and when fluid is not passed through the inlet tube, the closure closes the open end of the inlet tube and vents the valve to atmosphere, wherein when assembled the stem sleeve maybe selectively moved to communicate the single opening of the stem sleeve with the openings of the stationary body sleeve and fluid will flow to the selected outlet.

3. The diverting valve of claim 1 or 2 wherein the housing has detents provided proximate one end.

4. The diverting valve of claim 3 wherein the stationary body sleeve has detents disposed proximate the first end for locking a retaining ring in position.

5. The diverting valve of claim 3 wherein the outer wall of the stem has provided therewith a detent for engagement with a stop of a retaining ring which retains the moveable diverting stem and stationary body sleeve in engagement with one another.

6. The diverting valve of claim 1 or 2 wherein the inlet port extends from one end of the housing toward the cartridge receiving end of the housing and into the housing opening.

7. The diverting valve of claim 6 wherein the outlet ports extending through the housing from the outer wall to the inner wall into said housing opening.

8. The diverting valve of claim 1 or 2 wherein the outlet ports extending through the housing from the outer wall to the inner wall into said housing opening.

9. The diverting valve of claim 8 wherein said at least two outlet ports are directed on the same plane and open into the housing opening.

10. The diverting valve of claim 9 wherein the outer wall of the stem has provided therewith a detent for engagement with a stop of a retaining ring which retains the moveable diverting stem and stationary body sleeve in engagement with one another.

11. The diverting valve of claim 1 or 2 wherein the stationary body sleeve has detents disposed proximate the first end for locking a retaining ring in position.

12. The diverting valve of claim 11 wherein the outer wall of the stem has provided therewith a detent for engagement with a stop of a retaining ring which retains the moveable diverting stem and stationary body sleeve in engagement with one another.

13. The diverting valve of claim 1 or 2 wherein at least one of said openings of said body sleeve further comprise a plurality of radially disposed small openings working in cooperation with a check.

14. The diverting valve of claim 13 wherein the check is a disk shaped seal with integral seal portions proximate the circumference thereof to seat within the outer wall of the body sleeve and having a central opening to allow flow from the plurality of radially disposed small openings from the chamber to the housing outlet ports, and having a sealing surface disposed proximate each of the plurality of radially disposed openings to prevent any flow from the outlet ports of the housing to the chamber.

15. The diverting valve of claim 1 or 2 wherein the check for the inlet tube further comprising a resilient member tapering outwardly away from the inlet tube toward the inner wall of the moveable stem thereby allowing flow from the inlet tube to the chamber yet preventing flow from the chamber into the open end of the inlet tube.

16. The diverting valve of claim 1 or 2 wherein the single opening of the stem is provided with a seat for a seal surrounding the opening.

17. The diverting valve of claim 1 or 2 wherein the moveable stem further comprises a tube having an outer surface whose dimensions correspond substantially to the inner stem surface dimensions of the inner wall of the body sleeve defining the chamber and providing an intimate close tolerance fit therebetween yet allowing movement of the stem within the body sleeve.

18. A diverter valve with integral vacuum breaker back flow preventer and inlet and outlet check valves comprising a housing having two ends, one end for receiving a valve cartridge in use, the housing having an outer wall and an inner wall, the inner wall defining an opening extending from proximate one end to proximate the other end of the housing, the housing having an inlet port, the housing having at least two outlet ports; a stationary body sleeve having a first end and a second end and an inner and outer wall defining a sleeve opening, the second end of the body sleeve for insertion within the housing opening to proximate the inlet port in use, the body sleeve having an inlet within the sleeve opening in communication with the inlet port of the housing and extending a predetermined distance in the sleeve opening from the inlet port of the housing towards the cartridge receiving end of the housing to an open end, the inlet port having in communication therewith a check to allow flow from the inlet port but not back to the inlet port, the body sleeve having disposed therewith openings extending from the sleeve opening to the outer wall of the body sleeve and in direct communication with the at least two outlet ports of the housing, some of the openings of the body sleeve having been provided with a check which precludes reversal of flow into the valve; a moveable diverting stem having a first open end and a second vented end wherein a handle is disposed in use and having an inner and outer wall, the first and second ends of the moveable stem providing therebetween a hollow stem chamber wherein is disposed the waterway in use, said hollow stem chamber having an open end disposed at one end thereof and being the first end of the diverting stem and for insertion within the sleeve opening of the stationary body sleeve to proximate the inlet port of the housing, the diverting stem having disposed proximate the first end a single opening for selected communication with the openings of the stationary body sleeve; a closure moveable from a position spaced from the open end of the stem chamber closing the upper end of the diverter valve to the atmosphere, to a position closing the stem chamber of the diverter valve to atmosphere, whereby when fluid is fed through the valve the closure is moved away from the open end of the stem chamber closing the valve to atmosphere to permit the fluid to pass into the valve, and when fluid is not passed through the stem chamber, the closure opens the open end of the stem chamber to atmosphere and vents the valve to atmosphere, wherein when assembled the stem may be selectively moved to communicate the single opening of the stem with the openings of the stationary body sleeve and fluid will flow to the selected outlet port of the housing.

* * * * *